US012603721B2

(12) United States Patent　　　　(10) Patent No.: US 12,603,721 B2
Zhang et al.　　　　　　　　　　　　(45) Date of Patent: Apr. 14, 2026

(54) DATA TRANSMISSION METHOD AND APPARATUS, NETWORK DEVICE, SYSTEM, AND STORAGE MEDIUM

(71) Applicant: ZTE CORPORATION, Shenzhen (CN)

(72) Inventors: Weiliang Zhang, Shenzhen (CN); Xingang Huang, Shenzhen (CN); Liquan Yuan, Shenzhen (CN); Zhuang Ma, Shenzhen (CN); Haijun Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 254 days.

(21) Appl. No.: 18/288,907

(22) PCT Filed: Apr. 18, 2022

(86) PCT No.: PCT/CN2022/087259

§ 371 (c)(1),
(2) Date: Oct. 30, 2023

(87) PCT Pub. No.: WO2022/228163

PCT Pub. Date: Nov. 3, 2022

(65) Prior Publication Data

US 2024/0214104 A1　　Jun. 27, 2024

(30) Foreign Application Priority Data

Apr. 30, 2021　(CN) ........................ 202110485033.X

(51) Int. Cl.
　H04J 14/02　　　(2006.01)
　H04J 3/06　　　(2006.01)
(52) U.S. Cl.
　CPC ........ H04J 14/0245 (2013.01); H04J 3/0623 (2013.01)

(58) Field of Classification Search
　CPC .................................................. H04J 14/0245
　See application file for complete search history.

(56) References Cited

U.S. PATENT DOCUMENTS

2006/0115271 A1　6/2006　Hwang et al.
2008/0187317 A1*　8/2008　Yamabana ............ H04J 3/0605
　　　　　　　　　　　　　　　　　　　　　　398/98

(Continued)

FOREIGN PATENT DOCUMENTS

CN　　101218792 A　　7/2008
CN　　112583507 A　　3/2021

(Continued)

OTHER PUBLICATIONS

European Patent Office, the Extended European Search Report dated Apr. 9, 2025, for corresponding EP application No. 22794634.0.

(Continued)

*Primary Examiner* — Nathan M Cors
(74) *Attorney, Agent, or Firm* — Li & Cai Intellectual Property (USA) Office

(57)　　　ABSTRACT

The present disclosure provides a data transmission method and apparatus, a network device, a system, and a storage medium. The data transmission method includes: continuously sending downlink data frames of different rates at a first designated wavelength in a time-division multiplexing manner, with the downlink data frames carrying clock recovery information and time slot identification information of the downlink data frames of the different rates; and the clock recovery information is used for an optical network unit to perform clock recovery on the downlink data frames of the different rates, and the time slot identification (Continued)

information is configured to indicate time slot information of the downlink data frames of the different rates at the first designated wavelength.

17 Claims, 6 Drawing Sheets

(56) References Cited

U.S. PATENT DOCUMENTS

| | | | | |
|---|---|---|---|---|
| 2010/0290783 | A1* | 11/2010 | Kazawa | H04Q 11/0067 |
| | | | | 398/66 |
| 2018/0302183 | A1* | 10/2018 | Liu | H04J 14/0282 |
| 2019/0253152 | A1* | 8/2019 | Houtsma | H04B 10/541 |

FOREIGN PATENT DOCUMENTS

| | | | |
|---|---|---|---|
| EP | 3706342 A1 | 9/2020 | |
| WO | WO2007/114100 * | 12/2007 | H04L 12/28 |
| WO | WO 2007141100 A1 | 12/2007 | |

OTHER PUBLICATIONS

WIPO, International Search Report issued on Jul. 6, 2022.
CATT, "NR Time domain_slot, mini-slot and time interval", 3GPP TSG RAN WG1 Meeting#87 R1-1611366.

* cited by examiner downlink data frames of different rates are continuously sent at a first designated wavelength in a time-division multiplexing manner, with the downlink data frames carrying clock recovery information and time slot identification information of the downlink data frames of the different rates
S110
FIG. 1
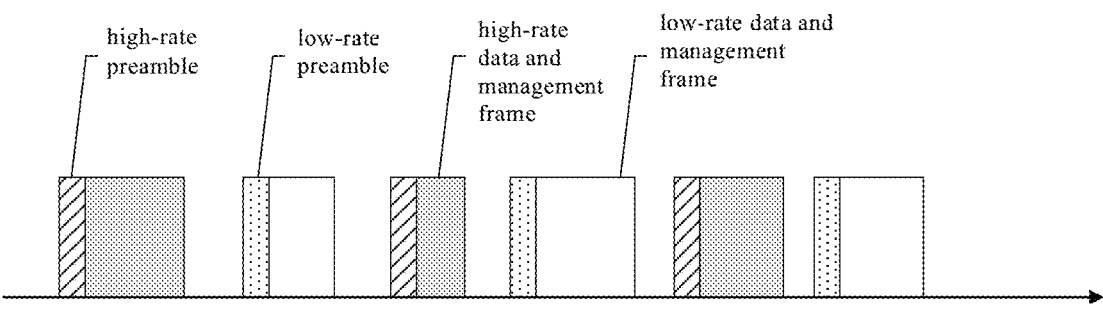
FIG. 2
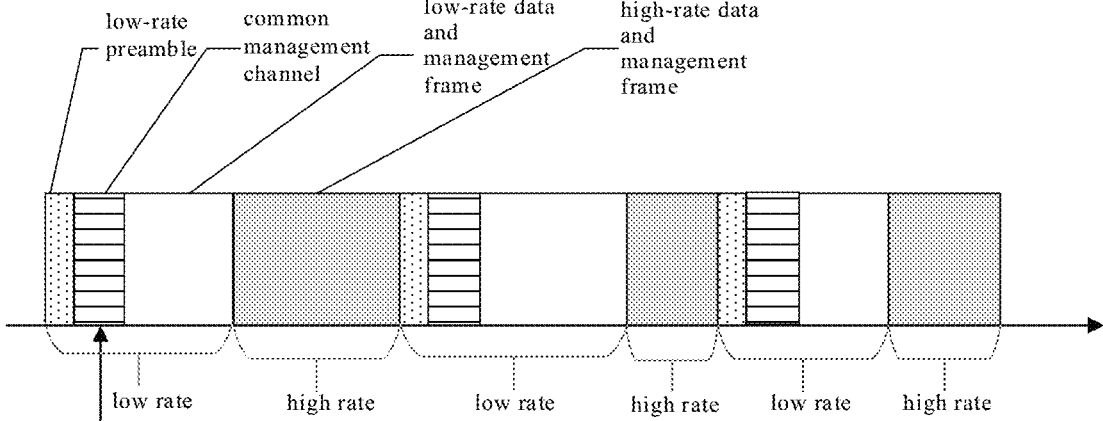
all OUNs detect and lock the common management channel
FIG. 3

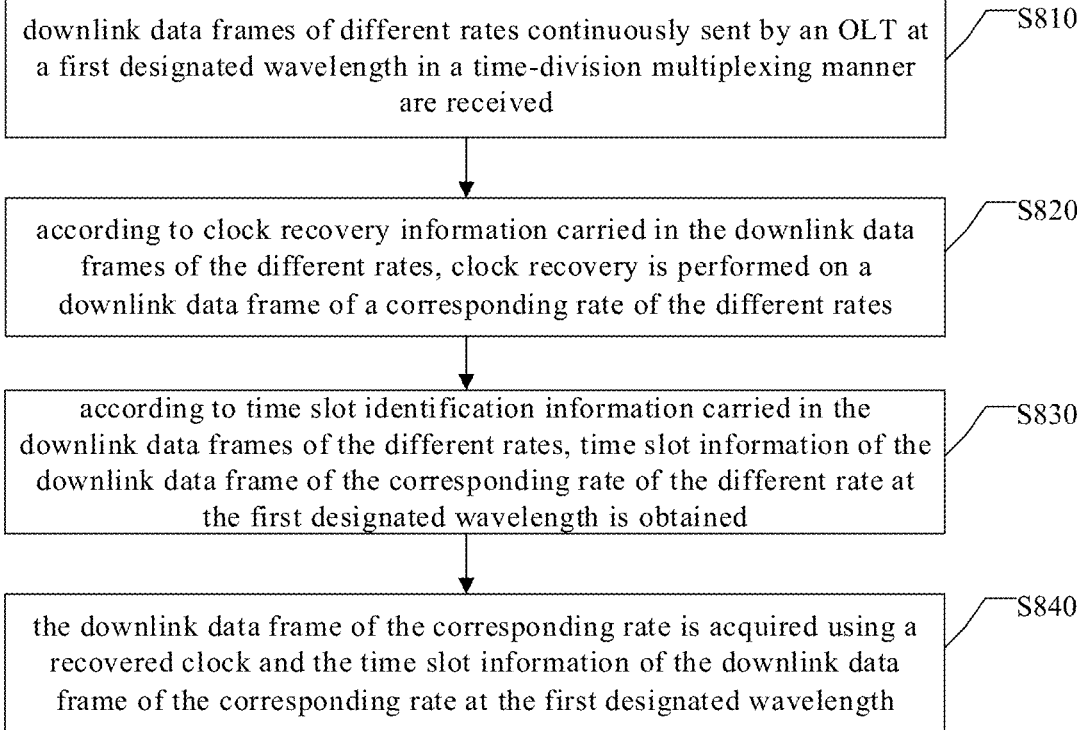

| downlink data frames of different rates continuously sent by an OLT at a first designated wavelength in a time-division multiplexing manner are received | S810 |

| according to clock recovery information carried in the downlink data frames of the different rates, clock recovery is performed on a downlink data frame of a corresponding rate of the different rates | S820 |

| according to time slot identification information carried in the downlink data frames of the different rates, time slot information of the downlink data frame of the corresponding rate of the different rate at the first designated wavelength is obtained | S830 |

| the downlink data frame of the corresponding rate is acquired using a recovered clock and the time slot information of the downlink data frame of the corresponding rate at the first designated wavelength | S840 |

FIG. 8

DATA TRANSMISSION METHOD AND APPARATUS, NETWORK DEVICE, SYSTEM, AND STORAGE MEDIUM

TECHNICAL FIELD

The present disclosure relates to the technical field of optical networks, and in particular, to a data transmission method and apparatus, a network device, a system, and a storage medium.

BACKGROUND

Due to point to multipoint network topology of Passive Optical Network (PON) and a passive characteristic of Optical Distribution Network (ODN), the PON can be used for networking of home networks. When deployment of a home network is carried out based on the PON, a policy of on-demand deployment and on-demand upgrade is usually adopted, that is, a PON with a low-rate standard is first deployed, and then is gradually upgraded to a PON with a high-rate standard, but the upgrade and evolution process may cause a relatively high cost.

SUMMARY

The present disclosure provides a data transmission method and apparatus, a network device, a system, and a storage medium.

An embodiment of the present disclosure provides a data transmission method applicable to an Optical Line Terminal (OLT), including: continuously sending downlink data frames of different rates at a first designated wavelength in a time-division multiplexing manner, with the downlink data frames carrying clock recovery information and time slot identification information of the downlink data frames of the different rates, wherein the clock recovery information is used for an optical network unit (ONU) to perform clock recovery on the downlink data frames of the different rates, and the time slot identification information is configured to indicate time slot information of the downlink data frames of the different rates at the first designated wavelength.

An embodiment of the present disclosure provides a data transmission method applicable to an ONU, including: receiving downlink data frames of different rates continuously sent by an OLT at a first designated wavelength in a time-division multiplexing manner, with the downlink data frames carrying clock recovery information and time slot identification information of the downlink data frames of the different rates; performing, according to the clock recovery information, clock recovery on a downlink data frame of a corresponding rate of the ONU: obtaining, according to the time slot identification information, time slot information of the downlink data frame of the corresponding rate of the ONU at the first designated wavelength: and acquiring the downlink data frame of the corresponding rate of the ONU using a recovered clock and the time slot information of the downlink data frame of the corresponding rate of the ONU at the first designated wavelength.

An embodiment of the present disclosure provides a data transmission apparatus applicable to an OLT, including: a downlink data sending module configured to continuously send downlink data frames of different rates at a first designated wavelength in a time-division multiplexing manner, with the downlink data frames carrying clock recovery information and time slot identification information of the downlink data frames of the different rates, wherein the clock recovery information is used for an ONU to perform clock recovery on the downlink data frames of the different rates, and the time slot identification information is configured to indicate time slot information of the downlink data frames of the different rates at the first designated wavelength.

An embodiment of the present disclosure provides a data transmission apparatus applicable to an ONU, including: a downlink data receiving module configured to receive downlink data frames of different rates continuously sent by an OLT at a first designated wavelength in a time-division multiplexing manner, with the downlink data frames carrying clock recovery information and time slot identification information of the downlink data frames of the different rates: a clock recovery module configured to perform clock recovery on a downlink data frame of a corresponding rate of the ONU according to the clock recovery information: a time slot acquisition module configured to acquire time slot information of the downlink data frame of the corresponding rate of the ONU at the first designated wavelength according to the time slot identification information: and a downlink data acquisition module configured to acquire the downlink data frame of the corresponding rate of the ONU using a recovered clock and the time slot information of the downlink data frame of the corresponding rate of the ONU at the first designated wavelength.

An embodiment of the present disclosure provides a network device, including: one or more processors: and a memory having stored thereon one or more programs which, when executed by the one or more processors, cause the one or more processors to implement the data transmission method according to the present disclosure.

An embodiment of the present disclosure provides a PON system, including: an OLT configured to perform the data transmission method applicable to the OLT according to the present disclosure: and an ONU configured to perform the data transmission method applicable to the ONU according to the present disclosure.

An embodiment of the present disclosure provides a storage medium having stored thereon a computer program which, when executed by a processor, implements the data transmission method according to the present disclosure.

BRIEF DESCRIPTION OF DRAWINGS

FIG. 1 is a flowchart illustrating a data transmission method according to the present disclosure:

FIG. 2 is a schematic diagram of formats of downlink data frames according to the present disclosure:

FIG. 3 is another schematic diagram of formats of downlink data frames according to the present disclosure;

FIG. 8 is another flowchart illustrating a data transmission method according to the present disclosure:

DETAIL DESCRIPTION OF EMBODIMENTS

Figure 4:
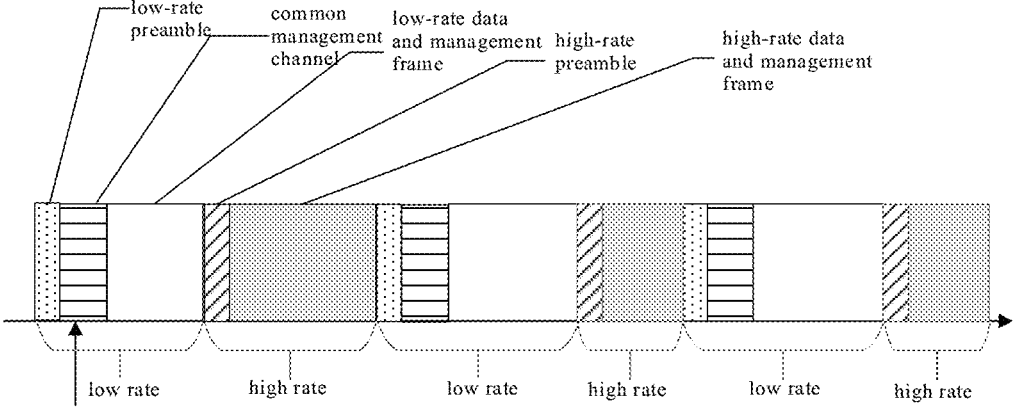
FIG. 4 is yet another schematic diagram of formats of downlink data frames according to the present disclosure.

In order to make the objectives, technical solutions and advantages of the present disclosure clearer, the embodiments of the present disclosure are further described in detail below in conjunction with the drawings. It should be noted that the embodiments described herein and the features therein can be arbitrarily combined with one another if no conflict is incurred.

A PON system in the embodiments of the present disclosure can support a plurality of rate standards, and the different rate standards support an operating mode of Time-Division Multiplexing (TDM) at a unified uplink wavelength, and support the operating mode of TDM at a unified downlink wavelength, and data of the different rate standards are sent and received in different time slots.

When applying the PON to the networking technology of the home networks, wires arranged for a home network may be generally controlled within several hundred meters. In addition, the home networks and the products thereof usually need to be economical and practical, and have a relatively high requirement on cost performance. Therefore, a policy of on-demand deployment and on-demand upgrade is usually adopted, that is, the PON with a low-rate standard is first deployed, and then is gradually upgraded to the PON with a high-rate standard.

In the upgrade and evolution process, if the evolution is carried out based on a wavelength division manner specified by the standards, the PONs with the different rate standards have different uplink and downlink wavelengths, and coexist in the wavelength division manner, with signals isolated by a wavelength division multiplexer and not affecting each other. However, the wavelength division multiplexing manner requires an OLT to simultaneously support the uplink and downlink wavelengths of the PON with each of the different rate standards, i.e., to support two sets of transmitters and receivers, and to be coupled with the wavelength division multiplexer, resulting in a relatively high cost.

For example, in an evolution process from a Gigabit-Capable PON (GPON) to a 10-Gigabit-Capable PON (XG-PON), the uplink and downlink wavelengths of the GPON are different from those of the XG-PON, the GPON and the XG-PON coexist in the wavelength division manner, with signals isolated by a wavelength division multiplexer and not affecting each other. However, the wavelength division multiplexing manner requires an OLT to simultaneously support the uplink and downlink wavelengths of the GPON and the uplink and downlink wavelengths of the XG-PON, i.e., supporting two sets of transmitters and receivers, and to be coupled with the wavelength division multiplexer, resulting in a relatively high cost.

In order to reduce the cost of the home networks deployed based on the PONs and improve the cost performance thereof, the present disclosure provides a data transmission method and apparatus, a network device, a system, and a storage medium.

FIG. 1 is a flowchart illustrating a data transmission method according to the present disclosure. As shown in FIG. 1, the data transmission method of the present disclosure is applied to an OLT, and may include the following operation S110.

In operation S110, downlink data frames of different rates are continuously sent at a first designated wavelength in a time-division multiplexing manner, with the downlink data frames carrying clock recovery information and time slot identification information of the downlink data frames of the different rates.

The clock recovery information is used for an ONU to perform clock recovery on the downlink data frames of the different rates, and the time slot identification information is configured to indicate time slot information of the downlink data frames of the different rates at the first designated wavelength.

According to the data transmission method of the present disclosure, the OLT can continuously send the downlink data frames of the different rates at the first designated wavelength in the time-division multiplexing manner, so that a unified downlink wavelength is defined for the downlink data frames of the different rates. Thus, the OLT needs merely one set of signal transmitter and signal receiver, and does not need an additional wavelength division multiplexer, resulting in an effect of reducing cost.

In the method, the downlink data frames of the different rates carry the clock recovery information of the different rates. The clock recovery information may be configured to instruct the ONU to perform clock recovery on a downlink data frame of a corresponding rate of the ONU. The downlink data frames of the different rates carry the time slot identification information of the different rates. The time slot identification information may be configured to instruct the ONU to perform time slot acquisition on the downlink data frame of the corresponding rate of the ONU. Thus, the ONU can easily achieve correct reception of data of the downlink data frame of the corresponding rate of the ONU according to a recovered clock and an acquired time slot, thereby improving data transmission efficiency.

Illustratively, taking the evolution from the GPON to the XG-PON as an example, a pair of a unified uplink wavelength and a unified downlink wavelength is defined for the GPON and the XG-PON. In the evolution process, the GPON and the XG-PON coexist in the time division manner, and the OLT needs merely one set of transmitter and receiver, and does not need an additional wavelength division multiplexer, so that an effect of reducing cost is achieved on the whole.

In the present disclosure, the OLT sends the downlink data frames of the different rates at the unified first designated wavelength in the time-division multiplexing manner, and the OLT in the PON system of the present disclosure may support transmission and reception of data at different rates, and the ONU may fixedly support an operating mode corresponding one rate, or may support operating modes corresponding to a plurality of rates. When the ONU supports the operating modes corresponding to the plurality of rates, the ONU may operate in an operating mode corresponding to one of the plurality of rates according to the configuration of the OLT.

It should be understood by those of ordinary skill in the art that the OLT can send downlink data frames of a plurality of different rates at the unified first designated wavelength in the time-division multiplexing manner. "A plurality of" means more than one, e.g., two different rates, three different rates . . . or N different rates, with N being an integer greater than 1.

In the present disclosure, a rate refers to a data transmission rate, and ONUs with different rates are ONUs with different data transmission rates.

Illustratively, among the N different rates, a $1^{st}$ rate may be the lowest rate, an $N^{th}$ rate may be the highest rate, and an $i^{th}$ rate is greater than an $(i-1)^{th}$ rate, with i being an integer greater than 1 and less than or equal to N. For a downlink data frame of the $i^{th}$ rate sent by the OLT, an ONU with the $i^{th}$ rate may be referred to as an ONU with the corresponding rate.

In the present disclosure, when an integral multiple relationship exists between the different rates, the corresponding clock recovery information may not be carried before a downlink data frame of the highest rate.

Illustratively, the existence of the integral multiple relationship between the different rates may be expressed as: among the N different rates, the $i^{th}$ rate is an integral multiple of the $(i-1)^{th}$ rate, with i being an integer greater than 1 and less than or equal to N.

In an example, due to the integral multiple relationship existing between the different rates, a highest-rate ONU in a downlink direction may always recover a clock, so that the corresponding clock recovery information may not be carried before the downlink data frame of the highest rate, so as to achieve effects of saving bandwidth and improving bandwidth utilization.

In the present disclosure, the clock recovery information at least includes: a corresponding preamble (Preamble) carried before a downlink data frame of a non-highest rate. When no integral multiple relationship exists between the different rates, the clock recovery information may further include: a corresponding preamble carried before the downlink data frame of the highest rate.

Illustratively, for example, the absence of the integral multiple relationship between the different rates may be expressed as: among the N different rates, the $i^{th}$ rate is not an integral multiple of the $(i-1)^{th}$ rate, with i being an integer greater than 1 and less than or equal to N.

The preamble may be a bit stream having a certain length and a certain rule, such as 1000 bit streams composed of alternately arranged 0 and 1, and the preamble is used for a receiver to recover and lock a clock.

No matter whether the integral multiple relationship exists between the different rates, the clock recovery information includes the preamble before the downlink data frame of the non-highest rate. When no integral multiple relationship exists between the different rates, the clock recovery information includes the preamble before the downlink data frame of the non-highest rate and the preamble before the downlink data frame of the highest rate, so that the ONU with each rate can easily recover clock information of the downlink data frame of the corresponding rate of the ONU in a simple and quick way with relatively low cost.

In the present disclosure, a downlink frame composed of the downlink data frames of the different rates may have periodicity: and in the downlink frame, a downlink data frame of each of the different rates may have periodicity.

In an example, for the continuously sent downlink data frames, one data frame period is, for example, 125 microseconds (μs), one superframe is sent every 62.5 us in the downlink direction, and a 10G superframe and a 2.5G superframe may be spaced apart from each other.

In the present disclosure, the downlink frame composed of the downlink data frames of the different rates may have periodicity: and in the downlink frame, a downlink data frame of each of the different rates may not have periodicity.

In an example, for the continuously sent downlink data frames, one data frame period is, for example, 125 μs, and a 10G superframe and a 2.5G superframe may be spaced apart from each other: and in the continuously sent data frames, each 10G superframe has different duration, and each 2.5G superframe has different duration.

In the present disclosure, the downlink frame composed of the downlink data frames of the different rates may not have periodicity: and in the downlink frame, a downlink data frame of each of the different rates may not have periodicity.

Illustratively, for the continuously sent downlink data frames, the data frames do not have periodicity, and a 10G superframe and a 2.5G superframe may be spaced apart from each other: and in the continuously sent data frames, each 10G superframe has different duration, and each 2.5G superframe has different duration.

In the present disclosure, the periodicity of the downlink frame composed of the downlink data frames of the different rates and the periodicity of the downlink data frames of the different rates may be implemented in more flexible ways, and all those implementation ways are applicable to the data transmission method of the present disclosure.

In the present disclosure, the time slot identification information may include: delimiters of the downlink data frames of the different rates and time slot management information of the downlink data frames of the corresponding rates. The delimiters are configured to indicate start positions of data in the downlink data frames of the different rates.

The time slot management information may include: lengths of the data in the downlink data frames of the corresponding rates, or bandwidth allocation information of the downlink data frames of the corresponding rates. The bandwidth allocation information may include: the lengths of the data in the downlink data frames of the corresponding rates and time slot information of the downlink data frames of the corresponding rates. The time slot information may include: a time-slot start time point and a time-slot length, or the time-slot start time point and a time-slot end time point.

In the present disclosure, since the time slot management information of the downlink data frames of the corresponding rates is carried in the downlink data frames, the ONU can obtain transmission time slots of the different rates, so that the ONU can receive downlink data in a transmission time slot of the corresponding rate of the ONU according to a recovered clock.

In the present disclosure, the delimiters in the time slot identification information may always be located before the downlink data frames of the corresponding rates.

In the present disclosure, a common management channel may be configured to carry the time slot management information of the downlink data frames of the different rates, and the common management channel operates at the lowest rate of the different rates.

In the present disclosure, the common management channel is introduced to indicate high-rate and low-rate transmission time slots and operates in a low-rate mode, thereby saving bandwidth.

In the present disclosure, the common management channel may be included in a downlink data frame of the lowest rate of the different rates.

In the present disclosure, the common management channel may be located before a downlink frame composed of the downlink data frames of the different rates, or may be located in the downlink data frame of the lowest rate. The common management channel may be configured flexibly according to actual needs.

The data transmission method according to the present disclosure may further include operation S101.

In the operation S101, management channels corresponding to the different rates are respectively configured, each of the management channels is configured to carry the time slot management information of a downlink data frame of a corresponding rate, and each of the management channels is located before the downlink data frame of the corresponding rate or all the management channels are located together before a downlink frame composed of the downlink data frames of the different rates.

In the present disclosure, by introducing the management channels respectively corresponding to the different rates to indicate transmission time slots of the downlink data frames of the corresponding rates, the ONUs with the different rates can detect the management channels of the corresponding rates of the ONUs, with no need to be switched to a lowest-rate operating mode.

In the operation S110, when the downlink data frames carry the time slot identification information, the downlink data frame of each of the different rates carries the time slot identification information of the downlink data frame of the corresponding rate.

In the present disclosure, the management channels may not be configured, and the downlink data frames of the different rates may carry the time slot identification information of the downlink data frames of the corresponding rates.

Specifically, the time slot identification information of the downlink data frames of the different rates may be respectively added to positions before or after the downlink data frames of the corresponding rates, or may be respectively added to middle positions of the downlink data frames of the corresponding rates. In some embodiments, for downlink frames each composed of the downlink data frames of the different rates, in each of the downlink frames, positions of the downlink data frames of a same rate may be the same or different, and the positions of the time slot identification information in the downlink data frames may be flexibly set.

In the present disclosure, before the operation S1101, the data transmission method may further include operations S11 and S12.

In operation S11, in round trip time of the OLT and the ONU, a downlink transmission delay is obtained by performing calculation according to a refractive index of a downlink wavelength and a refractive index of an uplink wavelength, start time of the ONU for sending an uplink data frame is determined according to the downlink transmission delay, and uplink bandwidth effective time of the ONU is set to be after the start time of the ONU for sending the uplink data frame.

In operation S12, a preset tentative uplink bandwidth is allocated to the ONU, and is adjusted according to a time difference between the uplink bandwidth effective time and uplink-data sending time which are reported by the ONU to obtain an adjusted uplink bandwidth for the ONU.

A specific flow of the data transmission method of the present disclosure is illustrated below by a plurality of examples in conjunction with FIG. 2 to FIG. 7. A high-rate data and management frame and a low-rate data and management frame shown in FIG. 2 to FIG. 7 are the downlink data frames of the different rates that are continuously sent by the OLT at the first designated wavelength in the time-division multiplexing manner.

For simplicity of description, in the plurality of examples described below, the specific flow of the data transmission method of the present disclosure is described by taking downlink data frames of two different rates as an example. However, the example of the downlink data frames of the two different rates should not be interpreted as limiting the scope or implementation possibilities of the solutions of the present disclosure, and a basic principle of a processing flow of the data transmission method for downlink data frames of more than two different rates is consistent with that of the processing flow of the data transmission method for the downlink data frames of the two different rates.

In some of the examples below, in addition to including a preamble, a frame format of each of the downlink data frames of the different rates may further include, for example, a delimiter, which may also be referred to as a synchronization header and is used for acquisition of a start position of the data in the downlink data frame. The frame format of each of the downlink data frames of the different rates may further include time slot management information which may be a length of the data in the data frame, or may be bandwidth allocation information configured to indicate a length of the data frame and indicate corresponding time slots of subsequent downlink data frames of a same rate. However, the present disclosure is not limited to the above-described configuration of the frame format. In some examples, the frame format of each of the downlink data frames of the different rates may merely include part of the contents of the above-described frame format, that is, the configuration of the frame format of each of the downlink data frames of the different rates is more flexible, which will be described below in conjunction with specific examples.

In the following description of the examples, for simplicity of description, among the downlink data frames of the N different rates sent by the OLT, if N=2, the smaller rate of the two different rates may be referred to as a low rate, and the greater rate of the two different rates may be referred to as a high rate. Correspondingly, an ONU with the smaller rate is called a low-rate ONU, and an ONU with the larger rate is called a high-rate ONU.

FIG. 2 is a schematic diagram of formats of downlink data frames according to the present disclosure.

As shown in FIG. 2, guardband time is set between the downlink data frames of the different rates, and is configured to instruct the ONU to perform preparation processing for clock recovery. The clock recovery information carried by the downlink data frames of the different rates includes: preambles of the different rates sent before the downlink data frames of the corresponding rates and configured to instruct the ONUs with the corresponding rates to perform clock recovery.

In this example, no dedicated management channel is configured between a sender device and a receiver device, and the guardband time is set between the data of the different rates sent by the sender device. The guardband time may be a number of bits having a fixed length and used for the receiver to prepare for clock recovery and adjustment according to the detected guardband time.

The downlink data frames of the different rates may further carry delimiters (Delimiter) and data length values. The delimiters and the data length values may be located after the preambles corresponding to the downlink data frames of the different rates, and are configured to indicate downlink-data start positions and downlink-data lengths in the corresponding downlink data frames.

In this example, since the delimiters and the data length information are carried in the data frames after the preambles, the receiver can position downlink data to be received based on the delimiters and the data length information after recovering a clock, so that data transmission accuracy of the ONU when receiving the downlink data can be improved with relatively low cost.

FIG. 3 and FIG. 4 are schematic diagrams of formats of downlink data frames according to the present disclosure.

As shown in FIG. 3 and FIG. 4, the OLT configures a common management channel for the continuously sent downlink data frames. The common management channel is located before each downlink frame composed of the downlink data frames of the different rates, and is included in the downlink data frames of the lowest rate.

In both FIG. 3 and FIG. 4, the common management channel is introduced for indicating high-rate transmission time slots and low-rate transmission time slots. The common management channel operates in the lowest-rate mode, and a lowest-rate management channel (i.e., a management channel in the lowest-rate mode) may be a bit stream of the lowest rate. When the receiver detects the common management channel, the receiver needs to operate in the lowest-rate mode: and after the receiver detects the common management channel and acquires the high-rate transmission time slots and the low-rate transmission time slots from the common management channel, if the receiver is not a receiver with the lowest rate, the receiver needs to be switched to an operating mode corresponding to a rate of the receiver: and if the receiver is the receiver with the lowest rate, the receiver is still kept in the lowest-rate operating mode.

High-rate data and low-rate data are continuously sent. In a switching process from the high-rate data to the low-rate data, a low-rate preamble with a certain length may be inserted before a low-rate downlink data frame for a low-rate receiver to recover a clock.

In FIG. 3 and FIG. 4, the low-rate management channel (i.e., the common management channel operating at the low rate) is a periodic low-rate management channel, which means that, for downlink frames each composed of the downlink data frames of the different rates, each of the downlink frames corresponds to one low-rate management channel. As shown in FIG. 3 and FIG. 4, in each of the downlink frames, the low-rate preamble may be located before the low-rate management channel, so as to enable the low-rate ONU to first perform clock recovery according to the low-rate preamble.

In FIG. 3 and FIG. 4, the OLT as the sender device sends low-rate time slot management information (i.e., time slot management information of the downlink data frame of the low rate) and high-rate time slot management information (i.e., time slot management information of the downlink data frame of the high rate) through the low-rate management channel. The high-rate ONU needs to be switched to the low rate for receiving the low-rate time slot management information and the high-rate time slot management information carried in the low-rate management channel, and the low-rate ONU may be always kept at the low rate to receive the low-rate time slot management information and the high-rate time slot management information. The low-rate management channel is configured to uniformly send the high-rate time slot management information and the low-rate time slot management information.

In a case where the common management channel is configured periodically, the time slot management information in each common management channel may include: start time and a time-slot length of the downlink data frame of each of the different rates, or the start time and end time of the downlink data frame of each of the different rates. In a case where the common management channel is not configured periodically, the time slot management information in each common management channel may further include: a position of a next common management channel.

In an example, the time slot management information may include time slot information of the downlink data frame of the high rate and time slot information of the downlink data frame of the low rate, and the time slot information may include start time and a time-slot length, or the time slot information may include the start time and end time. In another example, the time slot management information may further include a position of a next common management channel. Thus, the common management channel may be periodic or not, and may be configured according to data transmission requirements in actual application scenarios.

Referring to FIG. 3, in the downlink data frames of the different rates, if an integral multiple relationship exists between the different rates, the clock recovery information may include a preamble of downlink data frame of each of non-highest rates, and the preamble may be located between a previous downlink data frame of a different rate and the downlink data frame of the non-highest rate. No preamble may be carried before the downlink data frame of the highest rate.

In FIG. 3, the downlink data frames of the high rate and the downlink data frames of the low rate are continuously sent, and the high rate is an integral multiple of the low rate.

Illustratively, 10G is an integral multiple of 2.5G, one superframe is sent every 62.5 us in the downlink direction, and 10G superframes and 2.5G superframes are spaced apart from each other, with a tail of each superframe not being divided into packets. A 10G high-rate ONU and a 2.5G low-rate ONU search their respective superframe headers separately. If ONU Medium Access Control (MAC) is not deactivated due to a data error of the latter 62.5 μs, existing ONU MAC does not need to be modified, and merely OLT MAC is modified.

Since the high rate is an integral multiple of the low rate, the 10G high-rate ONU may always lock a clock, the 2.5G low-rate ONU cannot recover a clock in a 10G high-rate data stage and may recover the clock in a 2.5G low-rate data stage. Therefore, the high-rate ONU may always recover clocks of the downlink data frames of the high rate, without relying on a high-rate preamble for the clock recovery. The preamble of the downlink data frame of the non-highest rate may be a bit stream with a fixed length and a certain rule, so as to enable the ONU with the non-highest rate to recover and locked clocks, thereby saving the bandwidth and improving the bandwidth utilization.

Referring to FIG. 4, the example illustrated by FIG. 4 differs from the example illustrated by FIG. 3 in that no integral multiple relationship exists between the different rates, for example, the high rate is not an integral multiple of the low rate in FIG. 4. In such case, the clock recovery information may further include a preamble before the downlink data frame of the highest rate, i.e., a high-rate preamble before a high-rate data and management frame shown in FIG. 4.

In this example, in a switching process from the high rate to the low rate, a low-rate preamble with a certain length is inserted for a low-rate receiver to recover a clock; and in a switching process from the low rate to the high rate, a high-rate preamble with a certain length is inserted for a high-rate receiver to recover a clock.

In FIG. 4, the downlink data frames of the different rates are sent continuously, and the high rate is not an integral multiple of the low rate. The high-rate ONU cannot always recover clocks of the downlink data frames of the high rate, and thus needs to rely on the high-rate preamble to perform clock recovery on the downlink data frame of the high rate, that is, the high-rate preamble need to be added before the downlink data frame of the high rate. The high-rate preamble may be a bit stream with a fixed length and a certain rule, which facilitates clock recovery of the downlink data frame of the high rate at the high-rate ONU.

Figure 5:
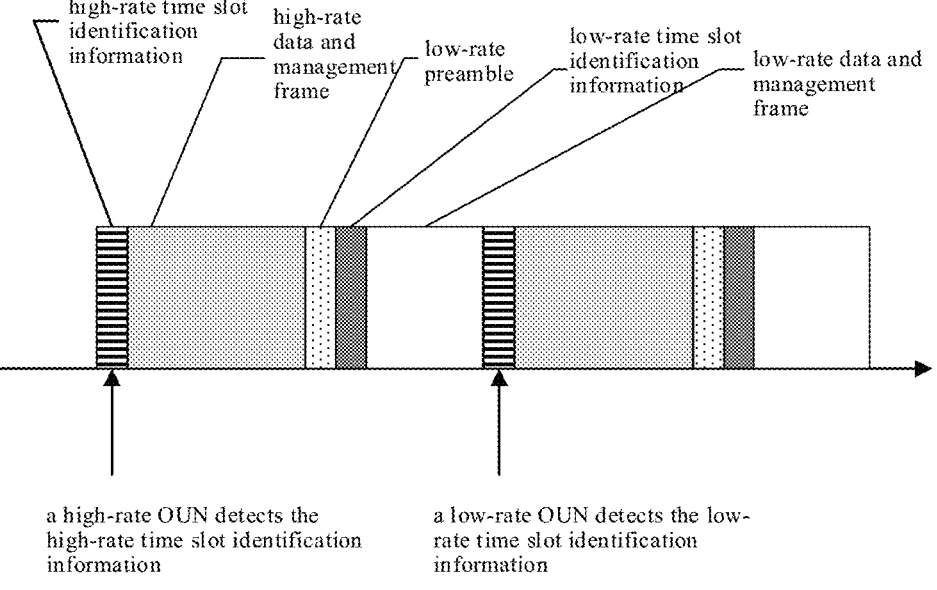
FIG. 5 is still another schematic diagram of formats of downlink data frames according to the present disclosure.
Figure 6:
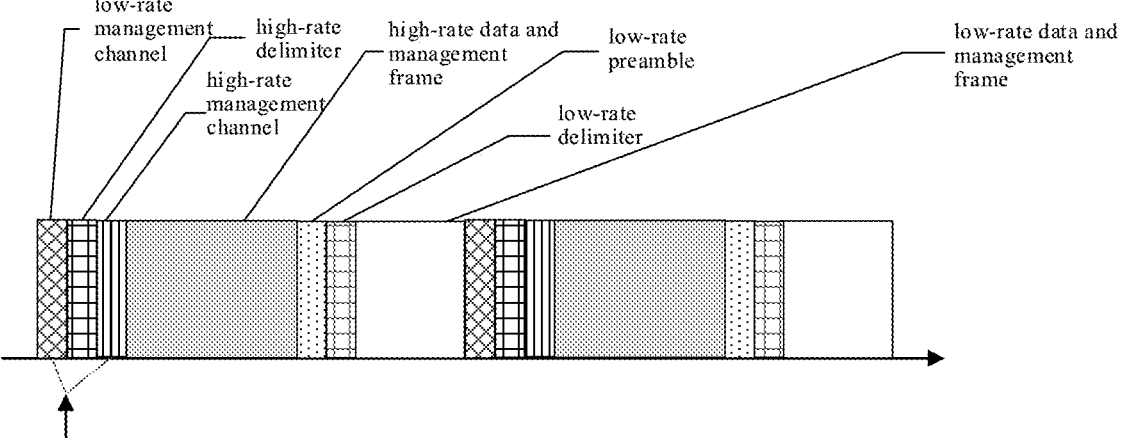
FIG. 6 is still another schematic diagram of formats of downlink data frames according to the present disclosure.
Figure 7:
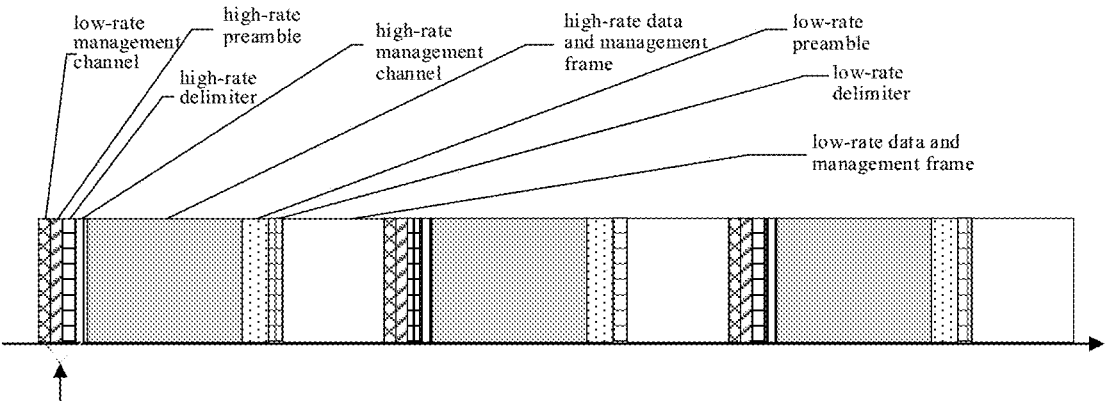
FIG. 7 is still another schematic diagram of formats of downlink data frames according to the present disclosure.

FIG. 5 to FIG. 7 are schematic diagrams of formats of downlink data frames according to the present disclosure.

Referring to FIG. 5 to FIG. 7, compared with the examples described above in conjunction with FIG. 3 and FIG. 4, in the examples described with reference to FIG. 5 to FIG. 7, the common management channel is cancelled for the downlink data frames of the different rates.

In FIG. 5, the high-rate ONU and the low-rate OMU may respectively perform clock recovery and clock locking according to the clock recovery information of the corresponding rates. In the time slots of the different rates, clocks may be out of lock, and a previously locked clock may be held if a clock is out of lock. In the continuously sent downlink data frames of the different rates, high-rate time slot identification information is carried by the downlink data frame of the high rate, low-rate time slot identification information is carried by the downlink data frame of the low rate, and data is received in the time slots corresponding to the corresponding rates according to the time slot identification information of the corresponding rates.

In FIG. 5, the time slot identification information of the downlink data frame of each rate may include: a delimiter (synchronization header) and time slot identification information of the downlink data frame of the corresponding rate. According to the delimiter (synchronization header) and the time slot identification information of the corresponding rate, the ONU may determine a start position of the data in the downlink data frame of the corresponding rate, and a start and an end of a time slot of the downlink data frame of the corresponding rate.

In FIG. 5, since an integral multiple relationship exists between the different rates, the clock recovery information may include a preamble before each downlink data frame of a non-highest rate, and the preamble may be located before the downlink data frame of the corresponding rate. If no integral multiple relationship exists between the different rates, the clock recovery information may further include a preamble before the downlink data frame of the highest rate.

In this example, in the downlink data frames of the different rates, through the high-rate delimiter (high-rate synchronization header) and the time slot identification information carried by the downlink data frame of the high rate and the low-rate delimiter (low-rate synchronization header) and the time slot identification information carried by the downlink data frame of the low rate, the data management channel is cancelled, and the clock recovery information and the time slot identification information are directly carried by the downlink data frames of the corresponding rates, so that complexity of the data frame formats is reduced, and the ONUs with the different rates can easily acquire the time slots of the corresponding rates while maintaining the operating modes corresponding to their own rates.

In FIG. 6 and FIG. 7, for the continuously sent downlink data frames of the different rates, the OLT as the sender device pre-configures management channels of the corresponding rates respectively, and the management channel corresponding to the downlink data frame of each rate operates at the corresponding rate. Therefore, the high-rate ONU does not need to be switched to the low rate for receiving management information, and may be kept at the high rate to receive the data and the management information, which reduces the number of times of switching of the operating modes of the high-rate ONU.

Referring to FIG. 6 and FIG. 7, each of the downlink data frame of the high rate and the downlink data frame of the low rate carries the corresponding time slot identification information, which includes a delimiter of the downlink data frame of the corresponding rate and time slot management information of the downlink data frame of the corresponding rate, and the time slot management information is carried through the management channel of the corresponding rate.

In FIG. 6 and FIG. 7, if no integral multiple relationship exists between the different rates, the clock recovery information (preamble) of the downlink data frame of each rate is carried before the downlink data frame of the corresponding rate, and the delimiter of the downlink data frame of each rate is located after the clock recovery information of the downlink data frame of the corresponding rate and before the time slot management information (carried through the management channel of the corresponding rate) of the downlink data frame of the corresponding rate. If an integral multiple relationship exists between the different rates, the clock recovery information of the corresponding rate may not be carried before the downlink data frame of the highest rate, the delimiter of the downlink data frame of the highest rate is located before the time slot management information (carried through the management channel of the corresponding rate) of the downlink data frame of the corresponding rate, and the delimiter of the downlink data frame of the non-highest rate is located after the clock recovery information of the downlink data frame of the corresponding rate and before the time slot management information (carried through the management channel of the corresponding rate) of the downlink data frame of the corresponding rate.

In this example, each of the high-rate ONU and the low-rate ONU may determine a start position of the data in the downlink data frame of the corresponding rate and a start and an end of a time slot of the downlink data frame of the corresponding rate according to the detected delimiter of the corresponding rate and the detected time slot management information of the corresponding rate, and receive the data in the transmission time slot of the corresponding rate.

As shown in FIG. 6 and FIG. 7, the management channels respectively configured for each rate may be located together before a downlink frame composed of the downlink data frames of the different rates.

In this example, on the basis of the example described above in conjunction with FIG. 5, the high-rate management information and the low-rate management information are placed together, but the high-rate management channel and the low-rate management channel are still distinguished from each other.

Referring to FIG. 6, if an integral multiple relationship exists between the downlink data frames of the different rates, the clock recovery information may include a preamble of the downlink data frame of each non-highest rate, and the preamble may be located before the downlink data frame of the corresponding rate, and the corresponding clock recovery information may not be carried before the downlink data frame of the highest rate.

In FIG. 6, the downlink data frames of the different rates are continuously sent, and an integral multiple relationship exists between the downlink data frames of the different rates. For example, the $i^{th}$ rate is an integral multiple of the $(i-1)^{th}$ rate. For example, the high rate is an integral multiple of the low rate, and in a switching process from the high rate to the low rate, a low-rate preamble with a certain length is inserted for a low-rate receiver to recover a clock: and since the high rate is an integral multiple of the low rate, a high-rate receiver may always hold a clock with no need for a corresponding high-rate preamble.

In this example, the delimiters of the downlink data frames of the different rates are configured to indicate start positions of the data in the downlink data frames of the corresponding rates, and the downlink data frames of the different rates respectively correspond to the management channels of the different rates, in which the respective time slot management information of the different rates is carried.

Referring to FIG. 7, no integral multiple relationship exists between the downlink data frames of the different rates. For example, the high rate is not an integral multiple of the low rate. For example, the $i^{th}$ rate is not an integral multiple of the $(i-1)^{th}$ rate. The clock recovery information may further include a preamble located before the downlink data frame of the high rate for clock recovery of the downlink data frame of the high rate.

In this example, the management channels of the different rates are introduced to indicate the respective transmission slots of the different rates. In FIG. 7, the high rate is not an integral multiple of the low rate. Therefore, the preambles of the corresponding rates need to be inserted before the downlink data frame of the high rate and before the down-link data frame of the low rate. A high-rate preamble of the corresponding rate is inserted before the high-rate management channel for the high-rate ONU to recover the clock.

Before the downlink data frames of the different rates are continuously sent at the first designated wavelength in the time-division multiplexing manner, a preset deviation tolerance value of arrival time for an uplink data frame sent by the ONU arriving at the OLT may be increased.

The preset deviation tolerance value is a deviation tolerance value determined according to a frequency difference and/or a phase difference between a sending clock of the ONU for sending the uplink data frame in a first scenario and a receiving clock of the OLT for receiving the uplink data frame, and the first scenario includes: the ONU uses a clock held by the ONU or a local clock due to a failure to recover a clock of a downlink data frame sent by the OLT.

Illustratively, for continuously sent 10G superframes and 2.5G superframes, clock processing and data transmission of a 2.5G ONU may include two modes: one is that the OLT ensures by bandwidth allocation that the 2.5G ONU can send the uplink data in a case where the clock is locked, which proposes higher requirements on ranging accuracy and bandwidth allocation: and the other is that a previously locked clock is held when the clock with the corresponding rate is not recovered in the 10G data stage, and if the data is sent using the held clock, the OLT may increase a tolerance degree by assessing a difference and change between the local clock of the ONU and an OLT clock.

In the present disclosure, in the downlink direction of data transmission, the ONUs supporting different downlink rates recover clocks in processes of receiving the downlink data of the corresponding rates, and support local operation and transmission of uplink data using the recovered clocks. In those processes, if the clock can be recovered (for example, a downlink rate of the ONU supporting the high rate is an integral multiple of the low rate), recovery of the clock is continued: if the clock cannot be recovered, previously recovered clock may be held and used for supporting the local operation and the transmission of the uplink data. In such case, certain difference in frequency and phase may exist between the sending clock of the uplink data of the ONU and the receiving clock of the OLT. Therefore, the OLT increases the tolerance degree (i.e., the deviation tolerance value), for example, the deviation tolerance value for the time when the uplink data arrives at the OLT is increased, so that the probability that the OLT successfully receives the uplink data can be increased, thereby improving stability and robustness of transmission system.

Before continuously sending the downlink data frames of the different rates at the first designated wavelength in the time-division multiplexing manner, the method may further include the following operations S11 and S12.

In the operation S11, in the round trip time of the OLT and the ONU, the downlink transmission delay is obtained by performing calculation according to the refractive index of the downlink wavelength and the refractive index of the uplink wavelength, the start time of the ONU for sending the uplink data frame is determined according to the downlink transmission delay, and the uplink bandwidth effective time of the ONU is set to be after the start time of the ONU for sending the uplink data frame.

In the operation S12, the preset tentative uplink bandwidth is allocated to the ONU, and is adjusted according to the time difference between the uplink bandwidth effective time and the uplink-data sending time which are reported by the ONU to obtain the adjusted uplink bandwidth for the ONU.

In the present disclosure, the downlink data frames of the different rates are all sent by the OLT, so both a clock frequency and a phase are stable, and the ONUs merely need to pay attention to the reception of the data of the corresponding rates. In an uplink direction, large differences may exist between clock frequencies/phases of uplink data frames of different rates sent by the different ONUs, so the OLT needs to learn and adjust reception of the uplink data frames of the different rates from the different ONUs in time.

In this example, the OLT performs the uplink bandwidth allocation, and the ONU may receive the downlink data of the corresponding rate and recover the clock, so as to be able to support the local operation and the transmission of the uplink data using the recovered clock when performing the transmission of the uplink data according to an obtained allocated bandwidth. Therefore, the ONU needs to be able to quickly recover the clock, which may be achieved with an efficient clock recovery technique. Moreover, the OLT needs to be more accurately aware of a transmission delay from the OLT to the ONU, and set the uplink bandwidth effective time of the ONU to be after the start time which is estimated by the OLT according to the transmission delay and refers to the time when the ONU may send the uplink data, so that it can be ensured that the bandwidth allocated to the ONU is effective after the ONU is ready to start sending the data. This needs a more accurate ranging technique, such as accurately calculating the downlink transmission delay according to the refractive indices of the downlink wavelength and the uplink wavelength in the round trip time of the OLT and the ONU. In addition, the tentative uplink bandwidth may be allocated by the OLT, and the ONU may be made to report the difference between the uplink bandwidth effective time and the sending time of the uplink data, so that the OLT can adjust the bandwidth allocation, thereby reducing a transmission delay during a whole data transmission process and improving accuracy of data transmission processing.

In the downlink direction, if an ONU with a first rate (the first rate is any one of the different rates) is provided and no service data of the first rate needs to be sent between the OLT and the ONU with the first rate, among the downlink data frames of the different rates sent by the OLT in the time-division multiplexing manner, data in a downlink data frame of the first rate is idle data or invalid data.

In the downlink direction, if an ONU with a corresponding rate is provided, even if there is no corresponding service data to be sent, a downlink data frame of the corresponding rate needs to be sent, and idle data or invalid data may be written to the downlink data frame of the corresponding rate, so as to ensure that the ONU with the corresponding rate may recover a clock.

According to the data transmission method of the present disclosure, in the downlink direction, the time slot corresponding to each rate may be indicated using the corresponding management channels, the downlink data of the different rates may be continuously sent with no guard band existing therebetween, and the preambles and delimiters (synchronization headers) of the corresponding rates are sent before the downlink data of the different rates, so that the ONUs can recover the clocks according to the preambles and position the start positions of the data according to the delimiters (synchronization headers) of the corresponding rates, thereby facilitating the improvement of the bandwidth utilization. Apparently, the management channels may not be adopted, guard bands are set between the downlink data of the different rates, and the preambles and the delimiters (synchronization headers) of the corresponding rates are sent before the downlink data of the different rates, so that the ONUs can recover the clocks according to the preambles and position the start positions of the data according to the delimiters (synchronization headers) of the corresponding rates, that is, the receivers are made to adapt, which is lower in bandwidth utilization but is low in cost and is easy to implement.

A specific flow of clock recovery and data reception by a receiver device (e.g., an ONU) in a data transmission process is illustrated below by specific examples. Specific details of formats of downlink data frames involved in the following examples are the same as those described in the aforesaid examples, and will not be repeated here.

FIG. 8 is another flowchart illustrating a data transmission method according to the present disclosure. As shown in FIG. 8, the data transmission method may be applied to an ONU, and includes the following operations S810 to S840.

In operation S810, downlink data frames of different rates continuously sent by an OLT at a first designated wavelength in a time-division multiplexing manner are received, with the downlink data frames carrying clock recovery information and time slot identification information of the downlink data frames of the different rates.

In operation S820, according to the clock recovery information, clock recovery is performed on a downlink data frame of a corresponding rate of the ONU.

In operation S830, according to the time slot identification information, time slot information of the downlink data frame of the corresponding rate of the ONU at the first designated wavelength is obtained.

In operation S840, the downlink data frame of the corresponding rate of the ONU is acquired using a recovered clock and the time slot information of the downlink data frame of the corresponding rate of the ONU at the first designated wavelength.

In the data transmission method, for the downlink data frames of the different rates continuously sent by the OLT at the first designated wavelength in the time-division multiplexing manner, a unified downlink wavelength is defined for the downlink data frames of the different rates. Thus, a sending side needs merely one set of signal transmitter and signal receiver, and does not need an additional wavelength division multiplexer, resulting in an effect of reducing cost. The ONU can perform the clock recovery on the downlink data frame of the corresponding rate of the ONU at a receiving side according to the clock recovery information carried by the downlink data frames of the different rates, and receive the downlink data frame of the corresponding rate using the recovered clock, thereby improving performance and accuracy of data transmission system.

The operation S820 may include: an ONU of each rate performs clock recovery on a downlink data frame of a corresponding rate of the ONU according to the clock recovery information before the downlink data frame of the corresponding rate.

If an integral multiple relationship exists between the different rates, the corresponding clock recovery information may not be carried before a downlink data frame of the highest rate of the different rates, so that the ONU with the highest rate may hold a clock of the downlink data frame of the corresponding rate.

Since the high rate is an integral multiple of the low rate, the high-rate ONU may always recover a clock of a downlink data frame of the high rate, without relying on a high-rate preamble for the clock recovery. A preamble of a downlink data frame of a non-highest rate may be a bit stream with a fixed length and a certain rule, so that the ONU with the non-highest rate can easily recover and lock a clock, thereby saving bandwidth and improving bandwidth utilization.

If an integral multiple relationship exists between the different rates and a receiving bandwidth of the ONU with the non-highest rate of the different rates is greater than a preset receiving bandwidth threshold, the ONU with the non-highest rate recovers a clock of the downlink data frame of the corresponding rate of the ONU from a downlink data frame of a second rate that is an integral multiple of the non-highest rate.

When a receiving bandwidth of an optical module of the low-rate ONU is large enough, the low-rate ONU can recover a low-rate clock from a high-rate signal, in which case the clock recovery information in a low-rate signal may not be sent, so as to save the bandwidth and improve the bandwidth utilization. When the OLT is not aware of the capability of the ONU, the OLT still sends the low-rate clock recovery information. When the OLT establishes communication with the ONU and acquires the fact from the ONU that the ONU has the capability of recovering the low-rate clock from the high-rate signal, the OLT may cancel the sending of the low-rate clock recovery information.

If an ONU with any rate fails to recover a clock in a process of receiving the downlink data frames of the different rates, the ONU which fails to recover the clock uses a held clock or starts a local clock.

If the ONU fails to recover a clock of a corresponding rate, the ONU holds a previously locked clock or starts a local clock, and sends an uplink data frame at a second designated wavelength according to an uplink bandwidth allocated by the OLT, so as to ensure normal sending of uplink data.

The time slot identification information may include delimiters of the downlink data frames of the different rates and time slot management information of the downlink data frames of the corresponding rates. The operation S830 may include the following operations S31 to S33.

In operation S31, a delimiter of the downlink data frame of the corresponding rate of the ONU is acquired from the time slot identification information, and a start position of data in the downlink data frame of the corresponding rate of the ONU is determined according to the acquired delimiter.

In operation S32, the time slot management information of the downlink data frame of the corresponding rate of the ONU is acquired from the time slot identification information, and a time-slot start time point and a time-slot end time point of the downlink data frame of the corresponding rate of the ONU at the first designated wavelength are determined according to the acquired time slot management information.

In operation S33, the start position of the data in the downlink data frame of the corresponding rate of the ONU, and the time-slot start time point and the time-slot end time point of the downlink data frame of the corresponding rate of the ONU at the first designated wavelength are taken as the time slot information of the downlink data frame of the corresponding rate of the ONU at the first designated wavelength.

Through the operations S31 and S33, the ONUs with the different rates can obtain the time slot information of the downlink data frames of the corresponding rates of the ONUs at the first designated wavelength. Receiver devices (i.e., the ONUs with the different rates) can obtain transmission time slots of the different rates through the time slot management information of the downlink data frames of the corresponding rates carried in the downlink data frames, so as to receive downlink data in the transmission time slots of the corresponding rates according to recovered clocks.

Before the operation S830, the time slot management information of the downlink data frame of each rate may be acquired from a detected common management channel in an operating mode corresponding to a rate of the ONU, so that the time slot management information of the downlink data frame of the corresponding rate of the ONU at the first designated wavelength may be obtained: or the time slot management information of the downlink data frame of each rate may be acquired from the detected common management channel in an operating mode corresponding to the lowest rate of the different rates, so that the time slot management information of the downlink data frame of the corresponding rate of the ONU at the first designated wavelength may be obtained.

If the ONU is an ONU with the lowest rate, the ONU may acquire the time slot management information of the downlink data frame of each rate from the detected common management channel either in the operating mode corresponding to the rate of the ONU or in the lowest-rate operating mode. If the ONU is not the ONU with the lowest rate, the ONU may acquire the time slot management information of the downlink data frame of each rate from the detected common management channel in the operating mode of the lowest rate of the different rates.

In one aspect, in a case where the time slot management information of the downlink data frame of each rate is carried in the common management channel pre-configured by the OLT, the common management channel operates at the lowest rate of the different rates.

Before the operation S830, the ONU needs to acquire the time slot management information of the downlink data frame of each rate from the detected common management channel in the lowest-rate operating mode, so as to obtain the time slot management information of the downlink data frame of the corresponding rate of the ONU at the first designated wavelength.

If the rate of the ONU is not the lowest rate, in the operation S32, after acquiring the time slot management information of the downlink data frame of the corresponding rate of the ONU from the time slot identification information, the ONU may be switched to an operating mode corresponding to the rate of the ONU. If the rate of the ONU is the lowest rate, in the operation S32, after acquiring the time slot management information of the downlink data frame of the corresponding rate of the ONU from the time slot identification information, the ONU may be kept in the lowest-rate operating mode.

The ONU can acquire a transmission time slot of the downlink data frame of each of the different rates through the common management channel. Since the common management channel operates in the lowest-rate operating mode, the ONU needs to operate in the lowest-rate mode when detecting the common management channel: after detecting the common management channel and acquiring high-rate transmission time slots and low-rate transmission time slots from the common management channel, an ONU with a non-lowest rate may be switched to an operating mode corresponding to the rate of the ONU, and the ONU with the lowest rate may be kept in the lowest-rate operating mode. In a transmission process of high-rate data, a clock may be out of lock, resulting in no reception of data. In a transmission process of non-highest-rate data, a clock is quickly recovered and locked at a low-rate preamble, and then low-rate data is received.

In the other aspect, the time slot identification information of the downlink data frame of each rate is carried in management channels which are pre-configured by the OLT and are respectively corresponding to the different rates, the management channels respectively corresponding to the different rates include time slot management information of the downlink data frames of corresponding rates, and are respectively located before the downlink data frames of the corresponding rates or are located together before a downlink frame composed of the downlink data frames of the different rates.

Before the operation S830, the ONU acquires the time slot management information of the downlink data frame of the corresponding rate of the ONU at the first designated wavelength from a detected management channel corresponding to the rate of the ONU.

The downlink data frames of the different rates are respectively configured with the management channels of the corresponding rates: and in each data frame period, the management channel corresponding to the downlink data frame of each rate operates at the respective rate. Therefore, a high-rate ONU does not need to be switched to the low rate for receiving management information, and may be kept at the high rate to receive the data and the management information, which reduces the number of times of switching of the operating modes of the high-rate ONU.

The data transmission method may further include operations S850 and S851.

In operation S850, according to the recovered clock of the downlink data frame of the corresponding rate of the ONU, an uplink data frame is sent at the second designated wavelength according to an uplink bandwidth allocated by the OLT.

In operation S851, if the clock recovery fails, the uplink data frame is sent at the second designated wavelength according to the uplink bandwidth allocated by the OLT using a clock held by the ONU or a local clock.

If the ONU fails to recover the clock of the corresponding rate, the ONU holds the previously locked clock and sends the uplink data frame at the second designated wavelength according to the uplink bandwidth allocated by the OLT, so as to ensure normal sending of the uplink data.

The operation S820 may include operations S41 and S42.

In operation S41, preparation processing for the clock recovery is performed in a case where guardband time is detected.

In operation S42, in a case where it is determined that a rate of a received preamble is a corresponding rate of the ONU, the clock recovery is performed on a downlink data frame to which the preamble of the corresponding rate belongs.

The receiver may perform rate discrimination, clock recovery and data reception according to the received preamble, so as to realize the clock recovery and the data reception of the downlink data frames in a very simple way with relative low cost.

The downlink data frames of the different rates may further carry delimiters and data length values, and the delimiters and the data length values may be located after preambles corresponding to the downlink data frames of the different rates, and are configured to indicate downlink-data start positions and downlink-data lengths in the corresponding downlink data frames.

After the receiver recovers a clock, the receiver positions downlink data to be received based on the delimiters and the data length information, so that data transmission accuracy of the ONU when receiving the downlink data can be improved with relatively low cost.

According to the data transmission method of the present disclosure, the ONU can obtain the time slot corresponding to each rate through the management channels of the corresponding rates in a downlink direction: since the downlink data of the different rates are continuously sent, guard bands may not be set therebetween: and according to the preambles and delimiters (synchronization headers) of the corresponding rates before the downlink data of the different rates, the ONU can recover the clock according to the preambles and position the start position of the data according to the delimiters (synchronization headers), thereby facilitating the improvement of the bandwidth utilization. If the management channels are not adopted, the guard bands may be set between the downlink data of the different rates: and according to the preambles and the delimiters (synchronization headers) of the corresponding rates before the downlink data of the different rates, the ONU can recover the clock according to the preambles and position the start position of the data according to the delimiters (synchronization headers), that is, the ONU can receive the data adaptively, which is lower in bandwidth utilization but is low in cost and is easy to implement.

A data transmission apparatus according to the embodiments of the present disclosure is described in detail below in conjunction with the drawings.

Figure 9:
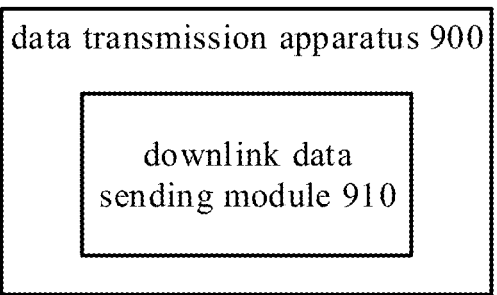
FIG. 9 is a schematic diagram of a structure of a data transmission apparatus according to the present disclosure.

FIG. 9 is a schematic diagram of a structure of a data transmission apparatus according to the present disclosure. As shown in FIG. 9, a data transmission apparatus 900 may be applied to an OLT, and may include a downlink data sending module 910.

The downlink data sending module 910 is configured to continuously send downlink data frames of different rates at a first designated wavelength in a time-division multiplexing manner, with the downlink data frames carrying clock recovery information and time slot identification information of the downlink data frames of the different rates. The clock recovery information is used for an ONU to perform clock recovery on the downlink data frames of the different rates, and the time slot identification information is configured to indicate time slot information of the downlink data frames of the different rates at the first designated wavelength.

When an integral multiple relationship exists between the different rates, the corresponding clock recovery information may not be carried before a downlink data frame of the highest rate.

The clock recovery information at least includes: a corresponding preamble carried before a downlink data frame of a non-highest rate. When no integral multiple relationship exists between the different rates, the clock recovery information may further include: a corresponding preamble carried before the downlink data frame of the highest rate.

In some embodiments, if it is determined that a receiving bandwidth of an ONU with a non-highest rate of the different rates is greater than a preset receiving bandwidth threshold, the corresponding clock recovery information is not carried before a downlink data frame of the corresponding non-highest rate.

A downlink frame composed of the downlink data frames of the different rates may have periodicity, and a downlink data frame of each of the different rates in the downlink frame may have periodicity: or the downlink frame composed of the downlink data frames of the different rates may have periodicity, and a downlink data frame of each of the different rates in the downlink frame may not have periodicity: or the downlink frame composed of the downlink data frames of the different rates may not have periodicity, and a downlink data frame of each of the different rates in the downlink frame may not have periodicity.

The time slot identification information may include delimiters of the downlink data frames of the different rates and time slot management information of the downlink data frames of the corresponding rates. The delimiters are configured to indicate start positions of data in the downlink data frames of the different rates. The time slot management information may include: lengths of the data in the downlink data frames of the corresponding rates, or bandwidth allocation information of the downlink data frames of the corresponding rates. The bandwidth allocation information may include: the lengths of the data in the downlink data frames of the corresponding rates and time slot information of the downlink data frames of the corresponding rates. The time slot information may include: a time-slot start time point and a time-slot length, or the time-slot start time point and a time-slot end time point.

The data transmission apparatus 900 may further include a management channel configuration module for configuring a common management channel to carry the time slot management information of the downlink data frames of the different rates, and the common management channel operates at the lowest rate of the different rates.

The common management channel may be included in a downlink data frame of the lowest rate of the different rates.

The management channel configuration module may be further configured to configure management channels respectively corresponding to the different rates, each of the management channels is configured to carry the time slot management information of a downlink data frame of a corresponding rate, and each of the management channels is located before the downlink data frame of the corresponding rate or all the management channels are located together before a downlink frame composed of the downlink data frames of the different rates.

When the downlink data sending module 910 carries the time slot identification information in the downlink data frames, the downlink data sending module 910 may respectively add the time slot identification information of the downlink data frame of each of the different rates before the downlink data frame of the corresponding rate.

The data transmission apparatus 900 may further include an adjustment module for deviation tolerance value configured to increase a preset deviation tolerance value for arrival time when an uplink data frame sent by the ONU arrives at the OLT before the downlink data sending module 910 continuously sends the downlink data frames of the different rates at the first designated wavelength in the time-division multiplexing manner.

The preset deviation tolerance value is a deviation tolerance value determined according to a frequency difference and/or a phase difference between a sending clock of the ONU for sending the uplink data frame in a first scenario and a receiving clock of the OLT for receiving the uplink data frame, and the first scenario includes: the ONU uses a clock held by the ONU or a local clock due to a failure to recover a clock of a downlink data frame sent by the OLT.

The data transmission apparatus 900 may further include a downlink-transmission-delay calculation module and an uplink bandwidth allocation module.

The downlink-transmission-delay calculation module is configured to perform calculation, before the downlink data sending module 910 continuously sends the downlink data frames of the different rates at the first designated wavelength in the time-division multiplexing manner, according to a refractive index of a downlink wavelength and a refractive index of an uplink wavelength in round trip time of the OLT and the ONU to obtain a downlink transmission delay, determine start time of the ONU for sending the uplink data frame according to the downlink transmission delay, and set uplink bandwidth effective time of the ONU to be after the start time of the ONU for sending the uplink data frame.

The uplink bandwidth allocation module is configured to allocate, before the downlink data sending module 910 continuously sends the downlink data frames of the different rates at the first designated wavelength in the time-division multiplexing manner, a preset tentative uplink bandwidth to the ONU, and adjust the tentative uplink bandwidth according to a time difference between the uplink bandwidth effective time and uplink-data sending time which are reported by the ONU to obtain an adjusted uplink bandwidth for the ONU.

In a downlink direction, if an ONU with a first rate (the first rate is any one of the different rates) is provided and no service data of the first rate needs to be sent between the OLT and the ONU with the first rate, among the downlink data frames of the different rates sent by the OLT in the time-division multiplexing manner, data in a downlink data frame of the first rate is idle data or invalid data.

According to the data transmission apparatus of the present disclosure, in the downlink direction, a time slot corresponding to each rate may be indicated using the corresponding management channels, the downlink data of the different rates may be continuously sent with no guard band existing therebetween, and the preambles and delimiters (synchronization headers) of the corresponding rates are sent before the downlink data of the different rates, so that the ONUs can recover the clocks according to the preambles and position the start positions of the data according to the delimiters (synchronization headers) of the corresponding rates, thereby facilitating improvement of bandwidth utilization. Apparently, the management channels may not be adopted, guard bands are set between the downlink data of the different rates, and the preambles and the delimiters (synchronization headers) of the corresponding rates are sent before the downlink data of the different rates, so that the ONUs can recover the clocks according to the preambles and position the start positions of the data according to the delimiters (synchronization headers) of the corresponding rates, that is, the receivers are made to adapt, which is lower in bandwidth utilization but is low in cost and is easy to implement.

Figure 10:
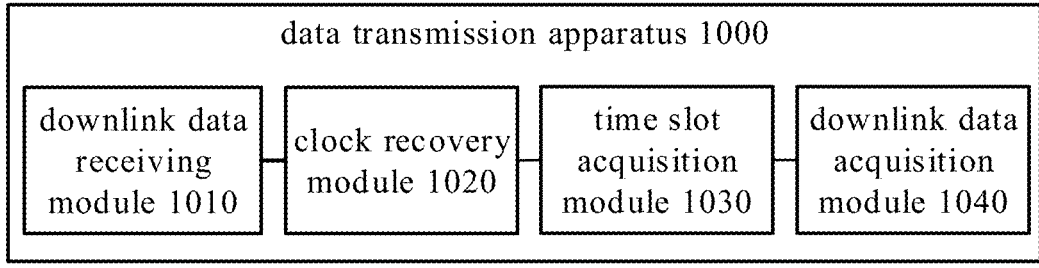
FIG. 10 is another schematic diagram of a structure of a data transmission apparatus according to the present disclosure.

FIG. 10 is another schematic diagram of a structure of a data transmission apparatus according to the present disclosure. As shown in FIG. 10, a data transmission apparatus 1000 may be applied to an ONU, and may include a downlink data receiving module 1010, a clock recovery module 1020, a time slot acquisition module 1030, and a downlink data acquisition module 1040.

The downlink data receiving module 1010 is configured to receive downlink data frames of different rates continuously sent by an OLT at a first designated wavelength in a time-division multiplexing manner, with the downlink data frames carrying clock recovery information and time slot identification information of the downlink data frames of the different rates.

The clock recovery module 1020 is configured to perform clock recovery on a downlink data frame of a corresponding rate of the ONU according to the clock recovery information.

The time slot acquisition module 1030 is configured to acquire time slot information of the downlink data frame of the corresponding rate of the ONU at the first designated wavelength according to the time slot identification information.

The downlink data acquisition module 1040 is configured to acquire the downlink data frame of the corresponding rate of the ONU using a recovered clock and the time slot information of the downlink data frame of the corresponding rate of the ONU at the first designated wavelength.

The clock recovery module 1020 may be configured to enable an ONU of each rate to perform clock recovery on a downlink data frame of a corresponding rate of the ONU according to the clock recovery information before the downlink data frame of the corresponding rate.

If an integral multiple relationship exists between the different rates, the corresponding clock recovery information is not carried before a downlink data frame of the highest rate of the different rates, so that the clock recovery module 1020 may be configured to enable an ONU with the highest rate to hold a clock of the downlink data frame of the corresponding rate.

If an integral multiple relationship exists between the different rates and a receiving bandwidth of an ONU with a non-highest rate of the different rates is greater than a preset receiving bandwidth threshold, the clock recovery module 1020 may be configured to enable the ONU with the non-highest rate to recover a clock of a downlink data frame of a corresponding rate of the ONU from a downlink data frame of a second rate that is an integral multiple of the non-highest rate.

If an ONU with any rate fails to recover a clock in a process of receiving the downlink data frames of the different rates, the clock recovery module 1020 may be configured to enable the ONU which fails to recover the clock to use a held clock or start a local clock.

The time slot acquisition module 1030 may include a delimiter acquisition unit and a time-slot-management-information acquisition unit.

The delimiter acquisition unit is configured to acquire a delimiter of the downlink data frame of the corresponding rate of the ONU from the time slot identification information, and determine a start position of data in the downlink data frame of the corresponding rate of the ONU according to the acquired delimiter.

The time-slot-management-information acquisition unit is configured to acquire the time slot management information of the downlink data frame of the corresponding rate of the ONU from the time slot identification information, and determine a time-slot start time point and a time-slot end time point of the downlink data frame of the corresponding rate of the ONU at the first designated wavelength according to the acquired time slot management information.

The time slot acquisition module 1030 may be configured to take the start position of the data in the downlink data frame of the corresponding rate of the ONU, and the time-slot start time point and the time-slot end time point of the downlink data frame of the corresponding rate of the ONU at the first designated wavelength as the time slot information of the downlink data frame of the corresponding rate of the ONU at the first designated wavelength.

The time slot acquisition module 1030 may be configured to: before acquiring the time slot management information of the downlink data frame of the corresponding rate of the ONU from the time slot identification information, acquire the time slot management information of the downlink data frame of each rate from a detected common management channel in an operating mode corresponding to a rate of the ONU, so as to obtain the time slot management information of the downlink data frame of the corresponding rate of the ONU at the first designated wavelength: or acquire the time slot management information of the downlink data frame of each rate from the detected common management channel in an operating mode corresponding to the lowest rate of the different rates, so as to obtain the time slot management information of the downlink data frame of the corresponding rate of the ONU at the first designated wavelength.

The time slot management information may be carried in the common management channel pre-configured by the OLT, and the common management channel operates at the lowest rate of the different rates, and includes the time slot management information of the downlink data frame of each rate.

Before acquiring the time slot information of the downlink data frame of the corresponding rate of the ONU at the first designated wavelength according to the time slot identification information, the time slot acquisition module 1030 may be further configured to enable the ONU to acquire the time slot management information of the downlink data frame of each rate from the detected common management channel in a lowest-rate operating mode, so as to obtain the time slot management information of the downlink data frame of the corresponding rate of the ONU at the first designated wavelength.

The data transmission apparatus 1000 may further include an operating-mode determination module. If the rate of the ONU is not the lowest rate, after the time-slot-management-information acquisition unit acquires the time slot management information of the downlink data frame of the corresponding rate of the ONU from the time slot identification information, the operating-mode determination module is configured to switch the ONU to an operating mode corresponding to the rate of the ONU. If the rate of the ONU is the lowest rate, after the time-slot-management-information acquisition unit acquires the time slot management information of the downlink data frame of the corresponding rate of the ONU from the time slot identification information, the operating-mode determination module is configured to keep the ONU in the lowest-rate operating mode.

The time slot identification information may be carried in management channels which are pre-configured by the OLT and are respectively corresponding to the different rates, and the management channels respectively corresponding to the different rates include the time slot management information of the downlink data frames of the corresponding rates, and are respectively located before the downlink data frames of the corresponding rates or are located together before a downlink frame composed of the downlink data frames of the different rates.

Before acquiring the time slot information of the downlink data frame of the corresponding rate of the ONU at the first designated wavelength according to the time slot identification information, the time slot acquisition module 1030 may be further configured to acquire the time slot management information of the downlink data frame of the corresponding rate of the ONU at the first designated wavelength from a detected management channel corresponding to the rate of the ONU.

The time slot identification information may include delimiters of the downlink data frames of the different rates and time slot management information of the downlink data frames of the corresponding rates. The time slot acquisition module 1030 may determine a start position of data in the downlink data frame of the corresponding rate of the ONU according to a delimiter of the downlink data frame of the corresponding rate of the ONU, and determine a time-slot start time point and a time-slot end time point of the downlink data frame of the corresponding rate of the ONU according to the time slot management information of the downlink data frame of the corresponding rate of the ONU.

According to the data transmission apparatus of the present disclosure, the ONU can obtain a time slot corresponding to each rate through the management channels of the corresponding rates in a downlink direction: since the downlink data of the different rates are continuously sent, guard bands may not be set therebetween: and according to the preambles and delimiters (synchronization headers) of the corresponding rates before the downlink data of the different rates, the ONU can recover the clock according to the preambles and position the start position of the data according to the delimiters (synchronization headers), thereby facilitating improvement of bandwidth utilization. If the management channels are not adopted, the guard bands may be set between the downlink data of the different rates: and according to the preambles and the delimiters (synchronization headers) of the corresponding rates before the downlink data of the different rates, the ONU can recover the clock according to the preambles and position the start position of the data according to the delimiters (synchronization headers), that is, the ONU can receive the data adaptively, which is lower in bandwidth utilization but is low in cost and is easy to implement.

It should be noted that the present disclosure is not limited to the specific configurations and processing described in the above embodiments and illustrated by the drawings. For convenience and simplicity of description, a detailed description of known methods is omitted herein, reference may be made to corresponding processes in the above method embodiments for specific operation processes of the systems, modules and units described above, and those specific operation processes will not be described in detail herein.

Figure 11:
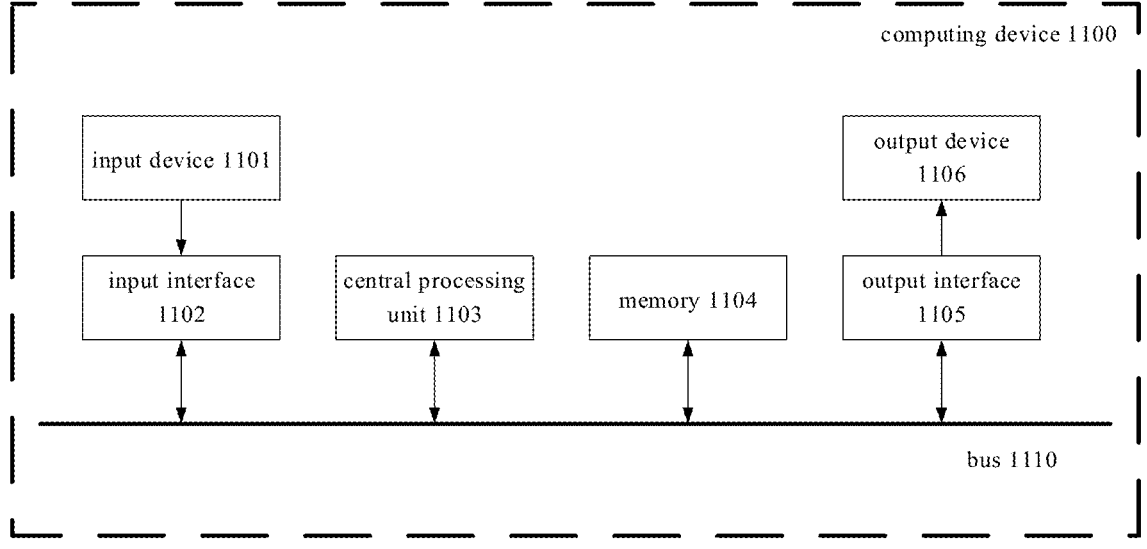
FIG. 11 is a schematic structural diagram illustrating an exemplary hardware architecture of a computing device capable of implementing a data transmission method and apparatus according to the present disclosure.

FIG. 11 is a schematic structural diagram illustrating an exemplary hardware architecture of a computing device capable of implementing a data transmission method and apparatus according to the present disclosure.

As shown in FIG. 11, a computing device 1100 includes an input device 1101, an input interface 1102, a central processing unit 1103, a memory 1104, an output interface 1105, and an output device 1106. The input interface 1102, the central processing unit 1103, the memory 1104, and the output interface 1105 are connected to each other through a bus 1110, and the input device 1101 and the output device 1106 are connected to the bus 1110 through the input interface 1102 and the output interface 1105 respectively, so as to be further connected to other components of the computing device 1100.

The input device 1101 receives input information from the outside, and transmits the input information to the central processing unit 1103 via the input interface 1102. The central processing unit 1103 processes the input information based on computer-executable instructions stored in the memory 1104 to generate output information, temporarily or permanently stores the output information in the memory 1104, and then transmits the output information to the output device 1106 via the output interface 1105. The output device 1106 outputs the output information out of the computing device 1100 for being used by users.

The computing device shown in FIG. 11 may be implemented as a network device which may include: a memory configured to store a program: and a processor configured to execute the program stored in the memory to perform the data transmission method described in each embodiment of the present disclosure.

Figure 12:
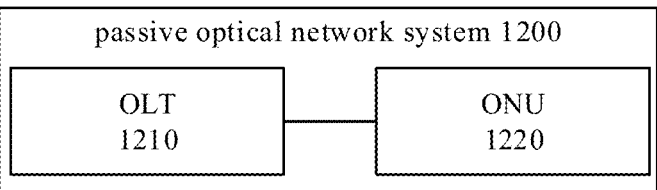
FIG. 12 is a schematic diagram of a structure of a PON system according to the present disclosure.

FIG. 12 is a schematic diagram of a structure of a PON system according to the present disclosure. As shown in FIG. 12, a PON system 1200 may include an OLT 1210 and an ONU 1220. The OLT 1210 is configured to perform the data transmission method applied to the OLT according to each embodiment of the present disclosure. The ONU 1220 is configured to perform the data transmission method applied to the ONU according to each embodiment of the present disclosure.

According to the PON system of the present disclosure, in the downlink direction, the time slot corresponding to each rate may be indicated using the corresponding management channels, the downlink data of the different rates may be continuously sent with no guard band existing therebetween, and the preambles and delimiters (synchronization headers) of the corresponding rates are sent before the downlink data of the different rates, so that the ONUs can recover the clocks according to the preambles and position the start positions of the data according to the delimiters (synchronization headers) of the corresponding rates, thereby facilitating the improvement of the bandwidth utilization. Apparently, the management channels may not be adopted, guard bands are set between the downlink data of the different rates, and the preambles and the delimiters (synchronization headers) of the corresponding rates are sent before the downlink data of the different rates, so that the ONUs can recover the clocks according to the preambles and position the start positions of the data according to the delimiters (synchronization headers) of the corresponding rates, that is, the receivers are made to adapt, which is lower in bandwidth utilization but is low in cost and is easy to implement.

The above embodiments are merely the exemplary embodiments of the present disclosure, and are not intended to limit the scope of the present disclosure. The various embodiments of the present disclosure may be implemented by hardware or special circuits, software, logic or any combination thereof. For example, some aspects of the present disclosure may be implemented by hardware and other aspects may be implemented by firmware or software executable by a controller, a microprocessor or other computing devices, but the present disclosure is not limited thereto.

The embodiments of the present disclosure may be implemented by a data processor of a mobile device executing computer program instructions. For example, the embodiments of the present disclosure are implemented in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source code or object code written in one programming language or in any combination of a plurality of programming languages.

A block diagram illustrating any logic flow in the drawings of the present disclosure may show operations of a program, or interconnected logic circuits, modules and functions, or a combination of the operations of the program and the logic circuits, modules and functions. The computer program can be stored on a memory. The memory may be of any type suitable to local technical environment and may be implemented using any suitable data storage technology. For example, the memory is, but not limited to, a Read-Only Memory (ROM), a Random Access Memory (RAM), and an optical storage device and system (a Digital Video Disc (DVD) or a Compact Disc (CD)). A computer-readable medium may include a non-transitory storage medium. The data processor may be of any type suitable to the local technical environment. For example, the data processor is, but not limited to, a general-purpose computer, a special purpose computer, a microprocessor, a Digital Signal Processors (DSP), an Application Specific Integrated Circuit (ASIC), a Field Programmable Gate Array (FGPA), and a processor based on multi-core architecture.

The exemplary embodiments of the present disclosure are illustrated in detail above by exemplary and non-limiting examples. For those of ordinary skill in the art, various modifications and adjustments to the above embodiments can be obviously derived from the accompanying drawings and the appended claims, but those modifications and adjustments are not beyond the scope of the present disclosure. Therefore, the proper scope of the present disclosure is defined by the appended claims.

What is claimed is:

1. A data transmission method applicable to an Optical Line Terminal (OLT), comprising:
    continuously sending downlink data frames of different rates at a first designated wavelength in a time-division multiplexing manner, with the downlink data frames carrying clock recovery information and time slot identification information of the downlink data frames of the different rates,
    wherein the clock recovery information is used for an Optical Network Unit (ONU) to perform clock recovery on the downlink data frames of the different rates, and the time slot identification information is configured to indicate time slot information of the downlink data frames of the different rates at the first designated wavelength,
    wherein in response to a receiving bandwidth of an ONU with a non-highest rate of the different rates being greater than a preset receiving bandwidth threshold, the corresponding clock recovery information is not carried before a downlink data frame of the non-highest rate.

2. The method of claim 1, wherein in a case of an integral multiple relationship existing between the different rates, the corresponding clock recovery information is not carried before a downlink data frame of the highest rate of the different rates, wherein the clock recovery information comprises: a corresponding preamble carried before a downlink data frame of a non-highest rate, and in a case of no integral multiple relationship existing between the different rates, the clock recovery information further comprises: a corresponding preamble carried before a downlink data frame of the highest rate of the different rates.

3. The method of claim 1, wherein the time slot identification information comprises: delimiters of the downlink data frames of the different rates and time slot management information of the downlink data frames of the corresponding rates, the delimiters are configured to indicate start positions of data in the downlink data frames of the different rates, the time slot management information comprises: lengths of data in the downlink data frames of the corresponding rates, or bandwidth allocation information of the downlink data frames of the corresponding rates, and the bandwidth allocation information comprises the lengths of the data in the downlink data frames of the corresponding rates and time slot information of the downlink data frames of the corresponding rates, and the time slot information comprises a time-slot start time point and a time-slot length, or comprises the time-slot start time point and a time-slot end time point.

4. The method of claim 3, further comprising:

configuring a common management channel to carry the time slot management information of the downlink data frames of the different rates, wherein the common management channel operates at the lowest rate of the different rates, and is included in a downlink data frame of the lowest rate of the different rates.

5. The method of claim 3, further comprising:

respectively configuring management channels corresponding to the different rates, with each of the management channels configured to carry the time slot management information of a downlink data frame of a corresponding rate, and each of the management channels is located before the downlink data frame of the corresponding rate or all the management channels are located together before a downlink frame composed of the downlink data frames of the different rates.

6. The method of claim 1, before continuously sending the downlink data frames of the different rates at the first designated wavelength in the time-division multiplexing manner, further comprising:

increasing a preset deviation tolerance value for arrival time when an uplink data frame sent by the ONU arrives at the OLT, wherein the preset deviation tolerance value is a deviation tolerance value determined according to at least one of a frequency difference and a phase difference between a sending clock of the ONU for sending the uplink data frame in a first scenario and a receiving clock of the OLT for receiving the uplink data frame, and the first scenario comprises that the ONU uses a clock held by the ONU or a local clock due to a failure to recover a clock of a downlink data frame sent by the OLT.

7. The method of claim 1, before continuously sending the downlink data frames of the different rates at the first designated wavelength in the time-division multiplexing manner, further comprising:

obtaining, in round trip time of the OLT and the ONU, a downlink transmission delay by performing calculation according to a refractive index of a downlink wavelength and a refractive index of an uplink wavelength, determining start time of the ONU for sending an uplink data frame according to the downlink transmission delay, and setting uplink bandwidth effective time of the ONU to be after the start time of the ONU for sending the uplink data frame; and allocating a preset tentative uplink bandwidth to the ONU, and adjusting the tentative uplink bandwidth according to a time difference between the uplink bandwidth effective time and uplink-data sending time which are reported by the ONU to obtain an adjusted uplink bandwidth for the ONU.

8. A network device, comprising:

one or more processors; and a memory having stored thereon one or more programs which, when executed by the one or more processors, cause the one or more processors to implement the data transmission method of claim 1.

9. A non-transitory computer-readable storage medium having stored thereon a computer program which, when executed by a processor, causes the processor to implement the data transmission method of claim 1.

10. A data transmission method applicable to an ONU, comprising:

receiving downlink data frames of different rates continuously sent by an OLT at a first designated wavelength in a time-division multiplexing manner, with the downlink data frames carrying clock recovery information and time slot identification information of the downlink data frames of the different rates;

performing, according to the clock recovery information, clock recovery on a downlink data frame of a corresponding rate of the ONU;

obtaining, according to the time slot identification information, time slot information of the downlink data frame of the corresponding rate of the ONU at the first designated wavelength; and acquiring the downlink data frame of the corresponding rate of the ONU using a recovered clock and the time slot information of the downlink data frame of the corresponding rate of the ONU at the first designated wavelength, wherein performing, according to the clock recovery information, clock recovery on the downlink data frame of the corresponding rate of the ONU comprises:

performing, by an ONU of each rate, clock recovery on a downlink data frame of a corresponding rate of the ONU according to the clock recovery information before the downlink data frame of the corresponding rate, in response to an integral multiple relationship existing between the different rates, the corresponding clock recovery information is not carried before a downlink data frame of the highest rate of the different rates, and the method further comprises:

holding, by an ONU with the highest rate, a clock of a downlink data frame of a corresponding rate, in response to an integral multiple relationship existing between the different rates and a receiving bandwidth of an ONU with a non-highest rate of the different rates being greater than a preset receiving bandwidth threshold, the method further comprises:

recovering, by the ONU with the non-highest rate, a clock of a downlink data frame of a corresponding rate of the ONU from a downlink data frame of a second rate, wherein the second rate is an integral multiple of the non-highest rate, and in response to an ONU with any rate failing to recover a clock in a process of receiving the downlink data frames of the different rates, the method further comprises:

enabling the ONU failing to recover the clock to use a held clock or start a local clock.

11. The method of claim 10, wherein obtaining, according to the time slot identification information, the time slot information of the downlink data frame of the corresponding rate of the ONU at the first designated wavelength comprises:

acquiring a delimiter of the downlink data frame of the corresponding rate of the ONU from the time slot identification information, and determining a start position of data in the downlink data frame of the corresponding rate of the ONU according to the acquired delimiter;

acquiring time slot management information of the downlink data frame of the corresponding rate of the ONU from the time slot identification information, and determining a time-slot start time point and a time-slot end time point of the downlink data frame of the corresponding rate of the ONU at the first designated wavelength according to the acquired time slot management information; and taking the start position of the data in the downlink data frame of the corresponding rate of the ONU, and the time-slot start time point and the time-slot end time point of the downlink data frame of the corresponding rate of the ONU at the first designated wavelength as the time slot information of the downlink data frame of the corresponding rate of the ONU at the first designated wavelength.

12. The method of claim 11, before acquiring the time slot management information of the downlink data frame of the corresponding rate of the ONU from the time slot identification information, further comprising:

in an operating mode corresponding to a rate of the ONU, acquiring time slot management information of a downlink data frame of each rate from a detected common management channel to obtain the time slot management information of the downlink data frame of the corresponding rate of the ONU at the first designated wavelength; or in an operating mode corresponding to the lowest rate of the different rates, acquiring the time slot management information of the downlink data frame of each rate from the detected common management channel to obtain the time slot management information of the downlink data frame of the corresponding rate of the ONU at the first designated wavelength.

13. The method of claim 12, wherein in response to the rate of the ONU not being the lowest rate, after acquiring the time slot management information of the downlink data frame of the corresponding rate of the ONU from the time slot identification information, the method further comprises:

switching to the operating mode corresponding to the rate of the ONU, and in response to the rate of the ONU being the lowest rate, after acquiring the time slot management information of the downlink data frame of the corresponding rate of the ONU from the time slot identification information, the method further comprises:

keeping, by the ONU, in the operating mode corresponding to the lowest rate.

14. The method of claim 10, wherein the time slot identification information is carried in management channels which are pre-configured by the OLT and are respectively corresponding to the different rates, and the management channels respectively corresponding to the different rates comprise time slot management information of the downlink data frames of the corresponding rates, the management channels respectively corresponding to the different rates are respectively located before the downlink data frames of the corresponding rates or are located together before a downlink frame composed of the downlink data frames of the different rates, and before obtaining, according to the time slot identification information, the time slot information of the downlink data frame of the corresponding rate of the ONU at the first designated wavelength, the method further comprises:

acquiring the time slot management information of the downlink data frame of the corresponding rate of the ONU at the first designated wavelength from a detected management channel of a corresponding rate of the ONU.

15. The method of claim 10, further comprising:

sending, according to a recovered clock of the downlink data frame of the corresponding rate of the ONU, an uplink data frame at a second designated wavelength according to an uplink bandwidth allocated by the OLT; and sending, in response to a failure of clock recovery, the uplink data frame at the second designated wavelength according to the uplink bandwidth allocated by the OLT using a clock held by the ONU or a local clock.

16. A network device, comprising:

one or more processors; and a memory having stored thereon one or more programs which, when executed by the one or more processors, cause the one or more processors to implement the data transmission method of claim 10.

17. A non-transitory computer-readable storage medium having stored thereon a computer program which, when executed by a processor, causes the processor to implement the data transmission method of claim 10.

* * * * *